United States Patent
Baik et al.

[11] Patent Number: 6,007,595
[45] Date of Patent: Dec. 28, 1999

[54] AIR FILTRATION UNIT EQUIPPED WITH ISOLATION BARS TO PREVENT TURBULENCE DOWNSTREAM OF PARTITION PANELS IN A CLEAN ROOM

[75] Inventors: Min Sun Baik; Yong Soo Kim, both of Chunan, Rep. of Korea

[73] Assignee: Samsung Electronics Co., Ltd., Suwon, Rep. of Korea

[21] Appl. No.: 09/045,371

[22] Filed: Mar. 20, 1998

[30] Foreign Application Priority Data

Aug. 26, 1997 [KR] Rep. of Korea ............. 97-40844

[51] Int. Cl.⁶ .................................................. B01D 46/12
[52] U.S. Cl. ........................ 55/385.2; 55/483; 55/484; 55/502; 454/187
[58] Field of Search .................. 55/385.1, 385.2, 55/483, 484, 355, 502; 454/187

[56] References Cited

U.S. PATENT DOCUMENTS

| | | |
|---|---|---|
| 3,350,862 | 11/1967 | Nutting ............................. 55/484 |
| 3,986,850 | 10/1976 | Wilcox ............................. 55/484 |
| 4,608,066 | 8/1986 | Cadwell, Jr. ..................... 55/484 |
| 4,710,208 | 12/1987 | Ziemer et al. ................... 55/484 |
| 4,986,050 | 1/1991 | Brunetti et al. ................. 55/484 |
| 5,279,090 | 1/1994 | Yamaguchi et al. ............. 55/355 |
| 5,364,425 | 11/1994 | Simon et al. .................. 55/385.2 |
| 5,871,556 | 2/1999 | Jeanseau et al. ............... 55/484 |

*Primary Examiner*—Duane S. Smith
*Attorney, Agent, or Firm*—Jones Volentine, LLP

[57] ABSTRACT

An isolation bar is provided across the center of an air filtration unit for a laminar flow clean room. When a panel for partitioning the clean room is installed across the center of a filter of the air filtration unit, the isolation bar is used for fixing the panel thereon, thereby dividing the filter into two sub-filters, instead of using two conventional half sized air filtration units that require respective fans for smooth downstream flow of air. As a result, the air filtration unit including the isolation bar according to the present invention is capable of reducing cost and power consumption without any efficiency loss.

12 Claims, 3 Drawing Sheets

AIR FILTRATION UNIT EQUIPPED WITH ISOLATION BARS TO PREVENT TURBULENCE DOWNSTREAM OF PARTITION PANELS IN A CLEAN ROOM

BACKGROUND OF THE INVENTION

1. Field of the Invention

The present invention relates to an air filtration unit for a clean room, more particularly, to an air filtration unit for a laminar flow clean room, which includes an isolation bar inserted into a filtering member thereof at a position corresponding to a partition panel installed in the clean room, so as to permit easy and rapid change in the layout of the clean room when moving or installing partition panels. The use of the isolation bars permits panels to be installed in positions crossing filtering members, while preventing turbulence downstream of the areas where the panels would otherwise block air flow through the filtering members.

2. Background of the Related Art

With increasingly precise manufacturing requirements, many industries are now demanding far greater purity and cleanliness standards to ensure high product efficiency and high production yields.

In particular, in the semiconductor, pharmaceutical, genetic engineering and material development fields, even a small number of microscopic contaminants such as dust particles contained in the air may cause poor quality products or failure to meet critical test parameters. Accordingly, contaminant control of the air is an important and growing concern, and as such, developments are continuing in an effort to achieve clean room systems that are capable of tightly controlling the contaminants in the air.

A clean room system typically comprises air supply and air exhaust areas that are in flow communication with a clean area. In the clean area, various pieces of equipment for fabricating or testing predetermined products are disposed. Air is supplied from the air supply area into the clean area through the ceiling of the clean area. The air in the clean area is then exhausted through the floor of the clean area and into the air exhaust area. Thereafter, the air supply area intakes air from the air exhaust area and supplies the air into the clean area. In such a manner, air is re-circulated in the clean room system.

The re-circulated exhaust air is filtered by air filtration units that are mounted on the ceiling of the clean area prior to flowing into the clean area. Each of the air filtration units is connected to a fan. The air filtration unit also includes a filter, which is generally 1200 mm×600 mm in size. The cleanliness level of the clean area depends on the performance of the filters.

In semiconductor fabrication, high efficiency particulate air (HEPA) filters or ultra low penetration air (ULPA) filters have been used for filtering the air. HEPA filters can filter over 99.97 percent of particles of 0.3 $\mu$m or larger. ULPA filters can filter over 99.99 percent of particles of 0.12 $\mu$m or larger.

The clean area is divided into three sub-areas: a work area in which operators work; a process area in which semiconductor fabricating equipment is disposed; and a service area in which the fabricating equipment is disassembled and checked. Panels having a predetermined thickness are used to partition the clean area into the sub-areas. The panels are fixedly and perpendicularly mounted along connections between the air filtration units.

However, when the layout of the clean room needs to be changed due to rearrangement of the fabricating equipment, or due to upgrades of the fabricating equipment, the panels must be rearranged and mounted according to a new layout. In some cases, the panels may have to be mounted across the center of a filter, rather than along the connection between the air filtration units as described above. However, when a panel is mounted across the center of a filter, the panel acts as an obstruction that disrupts the smooth downstream air flow. In addition, particles may be generated due to turbulence occurring at the boundary portion where the panel crosses the filter.

To overcome such disadvantages, half-sized filters, i.e., filters of 600 mm×600 mm in size, have been provided. Thus, two 600 mm×600 mm filters are used instead of one 1200 mm×600 mm filter. When the 600 mm×600 mm filters are used, the panels are not mounted across the center of the filters. However, the 600 mm×600 mm filters have disadvantages in that additional work is required for installation, and costs are increased because the smaller filters require additional mold bars for holding and supporting them.

Furthermore, each of the 600 mm×600 mm filters requires a separate fan in order to prevent turbulence from being generated at the gap between the mold bars holding and supporting the filters. As a result, compared with the 1200 mm×600 mm filters, the 600 mm×600 mm filters need twice as many fans, thereby increasing both costs and power consumption.

SUMMARY OF THE INVENTION

It is therefore an object of the present invention to provide an air filtration unit for a clean room, which includes an isolation member which can be inserted into a filtering member thereof, so as to allow panels to be mounted along the isolation member crossing the center of the filtering member without blocking air flow through the filtering member.

To achieve these and other objects the present invention provides an air filtration unit for clean room, which includes: a filtering member disposed downstream of a fan for filtering air flowing through the filtration unit; a frame surrounding the filtering member, for holding and supporting the filtering member, the frame being supported by mold bars; and an isolation member for separating the filtering member into predetermined sub-filtering members, wherein the isolation member has the same height as the mold bar supporting the frame, and a top surface of the isolation member projects downward in the direction of air flow such that the top surface of the isolation member and the top surface of the mold bar are level.

The predetermined sub-filtering members may be the same size, or may be of differing sizes. The isolation bar spans the frame such that the end surfaces of the isolation member contact inside surfaces of the frame. The isolation member has a width that is equal to or greater than a thickness of a panel to be mounted on the isolation member to thereby partition the clean room into subareas. Preferably, the isolation member has a width of about 5 cm. The isolation bar is formed of metal having high resistance to corrosion, preferably either stainless steel or an aluminum alloy.

The predetermined sub-filtering members may have the same air filtration efficiency or the predetermined sub-filtering members may have differing air filtration efficiencies. Preferably, one of the predetermined sub-filtering members is a high efficiency particulate air (HEPA) filter and the other is an ultra low penetration air (ULPA) filter.

BRIEF DESCRIPTION OF THE ATTACHED DRAWINGS

The accompanying drawings, which are included to provide a further understanding of the invention and are incorporated in and constitute a part of this specification, illustrate an embodiment of the invention, in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
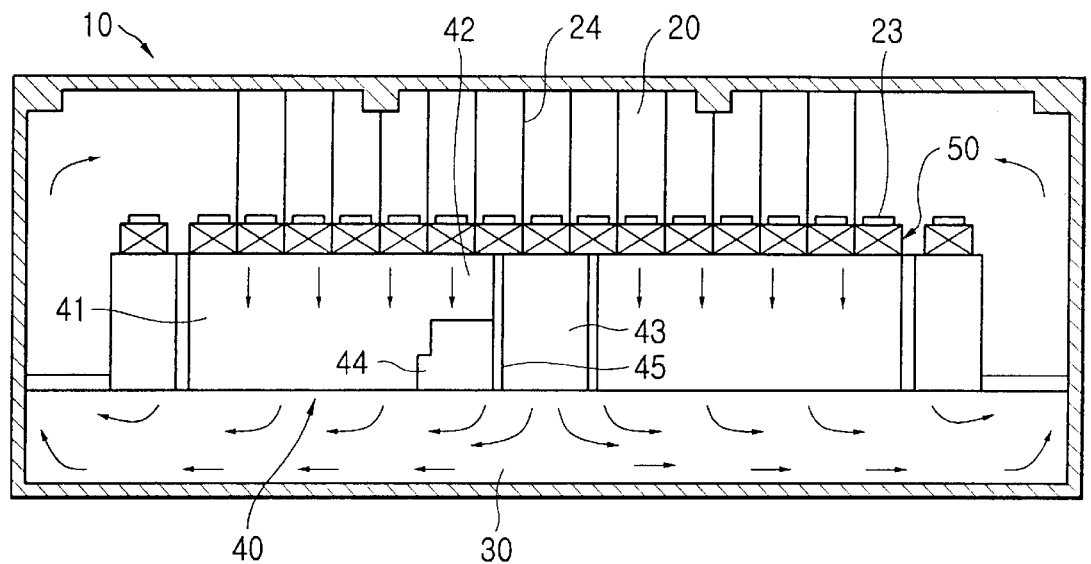
FIG. 1 is a schematic diagram of a clean room system according to an embodiment of the present invention.

FIG. 1 is a clean room system according to an embodiment of the present invention. The clean room system 10 includes three areas, namely, a clean area 40 in which various equipment for fabricating semiconductors is disposed and predetermined processes are carried out, an air exhaust area 30 into which air of the clean area 40 is exhausted through the floor of the clean area 40, and an air supply area 20 in which air from the air exhaust area 30 is re-circulated into the clean area 40 through the ceiling of the clean area 40. A plurality of air filtration units 50 are arranged on the ceiling of the clean area 40. The plurality of air filtration units 50 are respectively connected to fans 23 for circulating the air. A plurality of gratings (not shown) for exhausting the air are arranged on the floor of the clean area 40.

The clean area 40 is divided into three subareas: a work area 41 in which operators move and work; a process area 42 in which various equipment 44 for fabricating semiconductors is disposed and predetermined processes are carried out; and a service area 43 in which the equipment 44 is disassembled and checked. The subareas 41 and 42 are separated from the subarea 43 by means of panels 45, and the panels may be of varying thicknesses.

Figure 2:
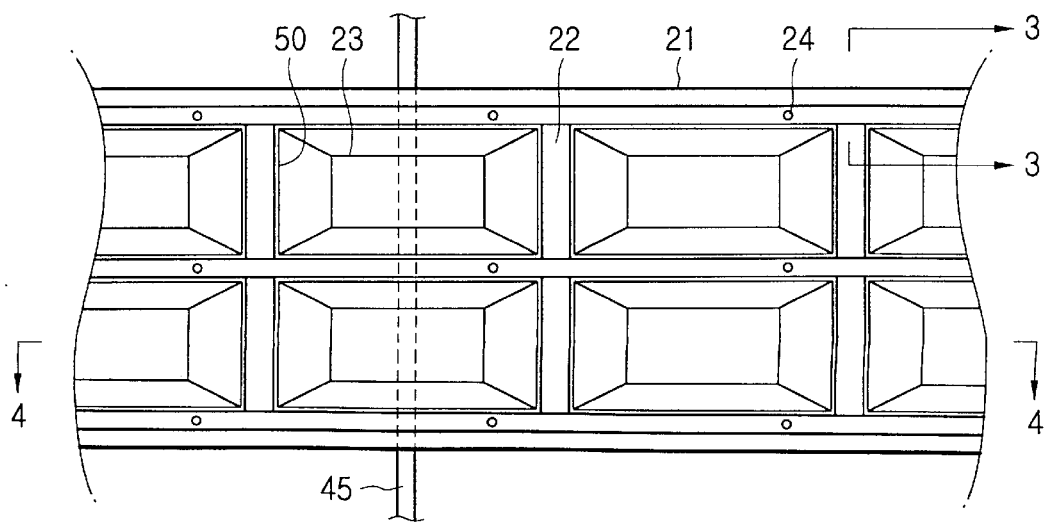
FIG. 2 is a top view of a portion of the ceiling of the clean area of the clean room system of FIG. 1.
Figure 3:
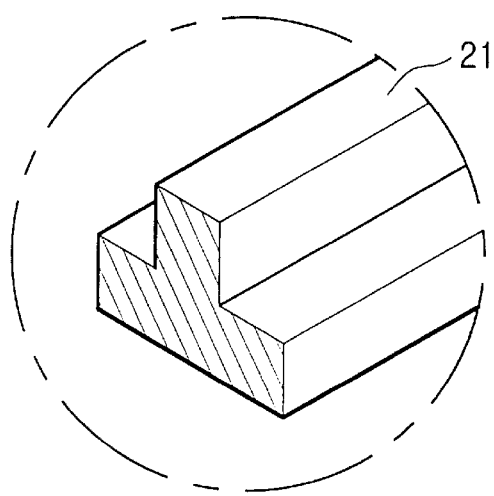
FIG. 3 is a cross-sectional view of the mold bar taken along the line 3—3 in FIG. 2.
Figure 4:
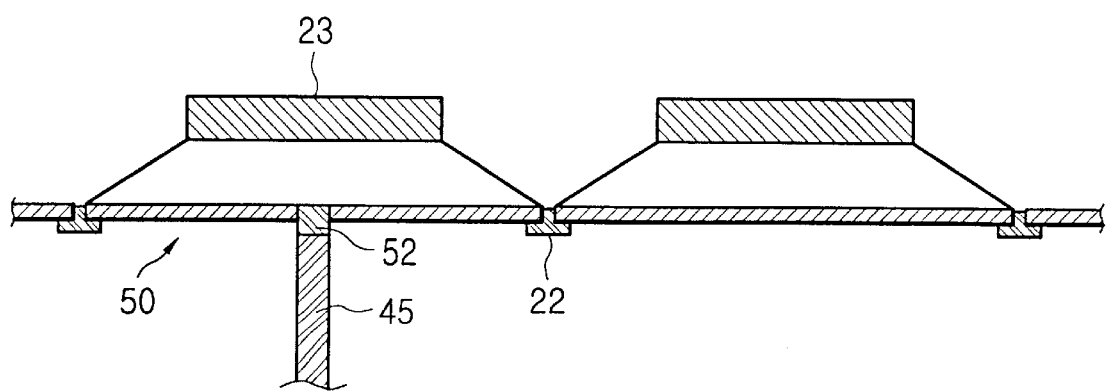
FIG. 4 is a sectional view taken along line 4—4 in FIG. 2.

FIG. 2 is a top view of a portion of the ceiling of the clean area 40 as shown in FIG. 1, FIG. 3 is a cross-sectional view of mold bar 21 taken along the line 3—3 in FIG. 2, and FIG. 4 is a sectional view taken along line 4—4 in FIG. 2.

As shown in FIG. 2, mold bars 21, each having an inverted T-shape as shown in FIG. 3, are arranged parallel and spaced apart from each other. For example, when 1200 mm×600 mm air filtration units 50 are used, vertical parts of the inverted T-shaped mold bars 21 are spaced apart from each other by 600 mm, which is the same distance as the lengths of the short sides of the air filtration units 50, so that the mold bars 21 hold and support the long sides of the air filtration units 50. The parallel mold bars 21 are fixedly connected to the ceiling of the air supply area 20 by means of long bolts 24 as shown in FIG. 1.

Referring again to FIG. 2, the short sides of the filtration units 50 are held and supported by parallel and spaced apart mold bars 22, which also have an inverted T-shape (FIG. 4), and which are perpendicular to the mold bars 21. As a result, the air filtration units 50 are enclosed and supported by the perpendicularly arranged mold bars 21 and 22. Fans 23 are installed on the air filtration units 50, respectively.

When panels 45 for partitioning the clean area 40 into subareas are installed across the centers of the air filtration units 50 as shown in FIG. 1, so as to accommodate a new layout for example, the panel 45 is installed on an isolation bar 52 disposed across the center of the air filtration unit 50 as shown in FIG. 4.

Figure 5:
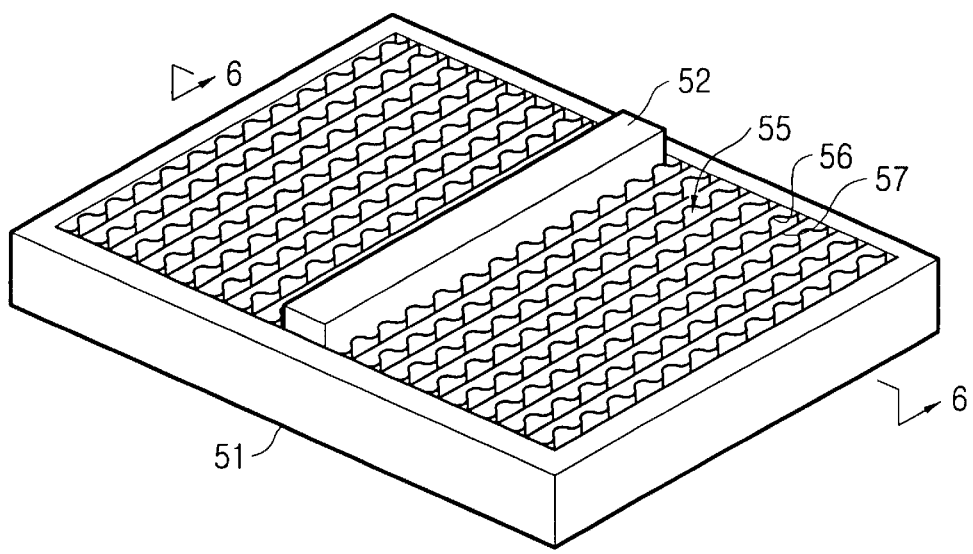
FIG. 5 is a schematic perspective view of an air filtration unit of the clean room system of FIG. 1.
Figure 6:
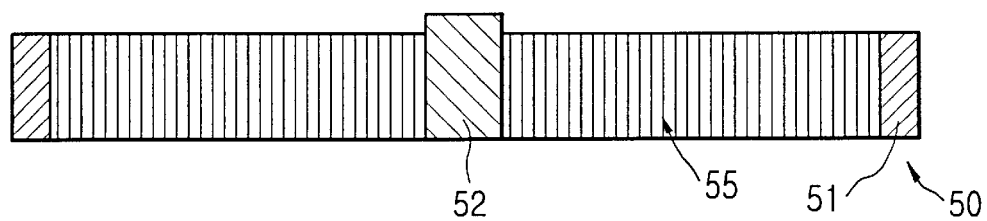
FIG. 6 is a sectional view taken along line 6—6 in FIG. 5.

The structure of the air filtration unit 50 of the present invention will be described with reference to FIGS. 5 and 6, in which FIG. 5 shows the air filtration unit 50, and FIG. 6 is a cross-sectional view taken along the lines 6—6 in FIG. 5.

As shown in FIG. 5, the air filtration unit 50 of the present invention includes a filtering member 55 for filtering air, and a frame 51 for holding and supporting the filtering member 55. The filtering member 55 includes a plurality of spaced apart separators 57 for controlling air flow, and a plurality of filtering media 56 for filtering the air which are respectively inserted between the separators 57. Each of the media 56 is shaped as a corrugated plate.

The isolation bar 52 is inserted in the space that was occupied by one or more of the separators 57 and media 56 at the center of the filtering member 55, thereby dividing the filtering member into two sub-filtering members. In this case, the two sub-filtering members are of equal size. The isolation bar 52 may also be inserted off-center, such that one of the sub-filtering members is larger than the other. The isolation bar 52 should have a high corrosion resistance. Preferably, the isolation bar 52 is formed of an aluminum alloy or stainless steel.

To ensure a smooth downstream air flow, it is desirous that the isolation bar span the entire distance between the sides of frame 51, such that the end surfaces of the isolation bar 52 contact the inside of frame 51.

Preferably, the top surface of the isolation bar 52 that is connected to the panel 45 has a width equal to or greater than the width or thickness of the panel 45. Typically, panel thicknesses range up to 5 cm and the width of the isolation bar 52 would be sized accordingly.

The isolation bar 52 spans the frame 51, and projects downward in the direction of air flow from its top surface, which is level with the top surface of the mold bars 21 and 22 that support the frame 51 of the air filtration unit 50, so that rapid and easy installation of the panels 45 is realized. The isolation bar 52 is preferably the same height as the mold bars 21 and 22.

Therefore, rather than having two smaller 600 mm×600 mm air filtration units as in the conventional clean room system, the present invention provides a single fan in flow communication with a single 1200 mm×600 mm air filtration unit including an isolation bar that allows easy and rapid installation of panels and prevents turbulence around an area where the panels are installed. This eliminates the need for additional mold bars and additional fans that were conventionally required for the smaller filters. The present invention thus deceases costs and power consumption, as well as reducing the time and manpower required to install the panels while rearranging the clean room. Also, with the present invention, the fan installed on the air filtration unit does not experience a decrease in efficiency and functions without turbulence because the isolation bar 52 installed in the air filtration unit completely removes the filtering member from the area within the frame 51, such that the filtering member is only present where the fan blows air into the clean area and not onto the top surface of the panel. Since the thickness of the isolation bar is equal to or greater than the thickness of the panel, the air filtered by the air filtration unit flows smoothly downstream into the clean area.

The filtering member separated by the isolation bar into sub-filtering members may include different materials having different efficiencies, for example, an ULPA filter for one and a HEPA filter for the other. Accordingly, by selectively installing different filtering members within each of the sub-filtering members, the filtering efficiency of the areas partitioned by the panels can be controlled with greater precision.

In summary, the 1200 mm×600 mm air filtration unit according to the present invention has the same efficiency as using two conventional 600 mm×600 mm air filtration units, but it has the advantages of lower cost and reduced power consumption.

While a preferred embodiment of the present invention has been described, it will be understood by those skilled in the art that various changes and modifications may be made, and equivalents may be substituted for elements thereof without departing from the true scope of the present invention. Therefore, it is intended that the present invention not be limited to the particular embodiment disclosed, but that the present invention include all embodiments falling within the scope of the appended claims.

What is claimed is:

1. An air filtration unit for a clean room comprising:
 a filtering member disposed downstream of a fan for filtering air flowing through said filtration unit;
 a frame surrounding said filtering member, for holding and supporting said filtering member, said frame being supported by mold bars; and
 a movable isolation member which is inserted into said filtering member for separating said filtering member into predetermined sub-filtering members, wherein said isolation member projects in the direction of air flow and has the same height as said mold bars that support said frame.

2. The air filtration unit for a clean room according to claim 1, wherein said predetermined sub-filtering members of said filtering member have equal areas.

3. The air filtration unit for a clean room according to claim 1, wherein said predetermined sub-filtering members of said filtering member have differing areas.

4. The air filtration unit for a clean room according to claim 1, wherein said isolation bar spans said frame, such that end surfaces of said isolation member contact inside surfaces of said frame.

5. The air filtration unit for a clean room according to claim 1, wherein a width of said isolation member is equal to or greater than a thickness of a panel to be connected to said isolation member to thereby partition the clean room.

6. The air filtration unit for clean room according to claim 5, wherein a width of said isolation member is about 5 cm.

7. The air filtration unit for a clean room according to claim 1, wherein said isolation member is formed of a metal having a high corrosion resistance.

8. The air filtration unit for a clean room according to claim 7, wherein said isolation member is formed of stainless steel.

9. The air filtration unit for a clean room according to claim 7, wherein said metal is an aluminum alloy.

10. The air filtration unit for a clean room according to claim 1, wherein said sub-filtering members formed by said isolation member have a common air filtering efficiency.

11. An air filtration unit for a clean room comprising:
 a filtering member disposed downstream of a fan for filtering air flowing through said filtration unit;
 a frame surrounding said filtering member, for holding and supporting said filtering member, said frame being supported by mold bars; and
 an isolation member for separating said filtering member into predetermined sub-filtering members, said sub-filtering members having differing air filtering efficiencies, wherein said isolation member projects in the direction of air flow and has the same height as said mold bars that support said frame and wherein a surface of said isolation bar contacts a panel for partitioning a space.

12. The air filtration unit for a clean room according to claim 1, wherein one of said sub-filtering members comprises a high efficiency particulate air (HEPA) filter, and another of said sub-filtering members comprises an ultra low penetration air (ULPA) filter.

* * * * *